(12) United States Patent
Algrain

(10) Patent No.: US 8,198,753 B2
(45) Date of Patent: *Jun. 12, 2012

(54) POWER SYSTEM WITH METHOD FOR ADDING MULTIPLE GENERATOR SETS

(75) Inventor: Marcelo C. Algrain, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 590 days.

This patent is subject to a terminal disclaimer.

(21) Appl. No.: 12/314,878

(22) Filed: Dec. 18, 2008

(65) Prior Publication Data

US 2009/0108678 A1 Apr. 30, 2009

Related U.S. Application Data

(63) Continuation-in-part of application No. 11/980,344, filed on Oct. 31, 2007, now Pat. No. 7,656,060.

(51) Int. Cl.
*H02J 9/00* (2006.01)
(52) U.S. Cl. ......................................... 307/84
(58) Field of Classification Search .............. 307/84
See application file for complete search history.

(56) References Cited

U.S. PATENT DOCUMENTS

| | | | |
|---|---|---|---|
| 3,665,495 A | 5/1972 | Carter et al. | |
| 3,794,846 A | 2/1974 | Schlicher et al. | |
| 4,471,233 A | 9/1984 | Roberts | |
| 4,492,874 A | 1/1985 | Near | |
| 4,508,974 A | 4/1985 | Henderson | |
| 5,761,073 A | 6/1998 | Dickson | |
| 5,811,960 A | 9/1998 | Van Sickle et al. | |
| 6,198,176 B1 | 3/2001 | Gillette | |
| 6,980,911 B2 | 12/2005 | Eaton et al. | |
| 7,038,423 B2 | 5/2006 | Reed et al. | |
| 7,656,060 B2 * | 2/2010 | Algrain | 307/84 |

* cited by examiner

*Primary Examiner* — Robert L. Deberadinis
(74) *Attorney, Agent, or Firm* — Finnegan, Henderson, Farabow, Garrett & Dunner LLP

(57) ABSTRACT

A method of operating a power system is provided. The power system has a plurality of generator sets and a bus. The method monitors the bus and generator sets disconnected from the bus. The method supplies to a control device information associated with the operating state of each of the generator sets and the bus. The method determines a relative frequency mismatch, multiplied by a first weight factor, and a relative phase mismatch, multiplied by a second weight factor, between the frequency and phase of the bus and a generator, and generates a frequency speed bias and a phase speed bias for the generator. The method adds the frequency and phase speed biases to form a total speed bias and connects the generator to the bus when the voltage, frequency, and phase of the generator are within a permissible range of the bus.

20 Claims, 7 Drawing Sheets

POWER SYSTEM WITH METHOD FOR ADDING MULTIPLE GENERATOR SETS

CROSS REFERENCE TO RELATED APPLICATIONS

This application is a continuation-in-part of U.S. patent application Ser. No. 11/980,344, filed on Oct. 31, 2007 (now U.S. Patent No. 7,656,060), which is incorporated herein by reference.

TECHNICAL FIELD

The present disclosure relates to a power system and, more particularly, to a power system with multiple generator sets.

BACKGROUND

Many power systems have multiple generator sets for supplying electricity to electric power loads. Some such power systems may have a group of generator sets that can all connect in parallel with a bus and supply power to a bus. In some circumstances, such a power system may have all of the generator sets in the group shut down and disconnected from the bus with no electricity flowing in the bus. In other circumstances, it may be desirable to increase the number of active generator sets. In such circumstances, various events may warrant initiating the supply of electricity from one or more of the generator sets in the group to the bus. After one generator set is connected to the bus, the voltage, frequency, and phase angle of any additional generator sets connected to the live bus should match that of the bus. A closer match will result in a smoother transition and a lower level of shock to the generator sets and electric power load.

U.S. Pat. No. 4,492,874 issued to Near, on Jan. 8, 1985 ("the '874 patent") discloses a power system with generator sets associated with an electrical power system, and a control method wherein the frequency and phase can be synchronized to the electrical power system in minimal time while minimizing thermal stress on the gas turbine hot-gas-path parts. The control method of the '874 patent is directed to synchronizing a gas turbine-driven generator to an AC power system by employing time control theory to directly drive the turbine-generator to a synchronization point. The fuel commands, synchronization points, and trajectories are selected in view of the need to minimize thermal stress on turbine hot-gas-path parts, while also minimizing time required for synchronization. The control method of the '874 patent uses two fuel commands, maximum fuel flow and minimum fuel flow, to drive the turbine-generator to a synchronization point. The minimum fuel flow command is issued for, at most, a predetermined maximum time duration calculated to minimize temperature stress on the gas turbine.

Although the control method of the '874 patent may allow phase and frequency matching in a minimal time while minimizing thermal stress on the gas turbine hot-gas-path parts, certain disadvantages persist. For example, the control method of the '874 patent uses actual data from the generator set, but then applies a model to calculate the speed adjustments. Using a model that has generator specific variables may be expensive to create, and the performance of the model will degrade as the gas turbine ages and its performance characteristics change. The '874 patent discloses that there are certain zones where the model will oscillate, without closing to a synchronization point, and then compensates by building in slight biases. There is a risk that the imperfections in the model over the actual gas turbine performance will offset the biases and lock the control method of the '874 patent in a loop where it cannot close the generator to a synchronization point that will allow the generator set to be connected to the live bus.

The power system and methods of the present disclosure are directed to one or more improvements in existing technology.

SUMMARY

One disclosed embodiment relates to a method of operating a power system, the power system having a plurality of generator sets and a bus, each generator set including at least a generator and an engine. The method may include monitoring at least one generator set that is disconnected from the bus and monitoring the bus. The method may also include supplying to a control device information associated with the operating state of each of the generator sets and information associated with the bus. The method may further include determining a relative frequency mismatch between the frequency of the bus and the frequency of a generator and multiplying the relative frequency mismatch between the frequency of the bus and the frequency of the generator by a first weight factor to generate a frequency speed bias for the generator set. The method may also include determining a relative phase mismatch between the phase of the bus and the phase of the generator and multiplying the relative phase mismatch between the phase of the bus and the phase of the generator by a second weight factor to generate a phase speed bias for the generator set. The method may further include adding the frequency speed bias and the phase speed bias to form a total speed bias and connecting the generator to the bus when the voltage, frequency, and phase of the generator are within a permissible range of the voltage, frequency, and phase of the bus.

Another embodiment relates to a power system, the power system having a bus and a plurality of generator sets operable to supply electricity to an electric power load. The generator set includes at least a generator and an engine. The power system may include a frequency speed bias circuit configured to input a voltage waveform from a generator, input a voltage waveform from the bus, generate a relative frequency mismatch, multiply the relative frequency mismatch by a first weight factor, and output a frequency speed bias from a first PID controller. The power system may also include a phase speed bias circuit configured to input a voltage waveform from the generator, input a voltage waveform from the bus, generate a signal proportional to a phase error between the generator and the bus, multiply the signal proportional to the phase error between the generator and the bus by a second weight factor, and output a phase speed bias from a second PID controller. The power system may further include a total speed bias circuit configured to add the frequency speed bias and the phase speed bias to form a total speed bias. The power system may further include a generator breaker configured to connect the generator to the bus when the voltage, frequency, and phase of the generator are within a permissible range of the voltage, frequency, and phase of the bus.

A further embodiment relates to a power system. The power system may include a bus, a plurality of generator sets operable to supply electricity to an electric power load, and a generator set including at least a generator and an engine. The power system may further include a synchronization and load sharing control. The synchronization and load sharing control may include a frequency speed bias circuit, including a bandpass filter, a hard limiter, an integrator which resets on leading edge, a hold block, a summer, a first weight factor multiplier, and a first PID controller, the frequency speed bias circuit outputting a frequency speed bias. The synchronization and load sharing control may also include a phase speed bias circuit, including a bandpass filter, a hard limiter, an integrator which resets on leading edge, a first logic function block, a hold block, a leading edge detector, a second logic function block, a second weight factor multiplier, and a second PID controller, the phase speed bias circuit outputting a phase speed bias. The synchronization and load sharing control may further include a total speed bias circuit, including a summer and a limiter, the total speed bias circuit outputting a total speed bias. The power system may also include a generator breaker to connect the generator set to the bus when the voltage, frequency, and phase of the generator set are within a permissible range of the voltage, frequency, and phase of the bus.

DETAILED DESCRIPTION

Figure 1:
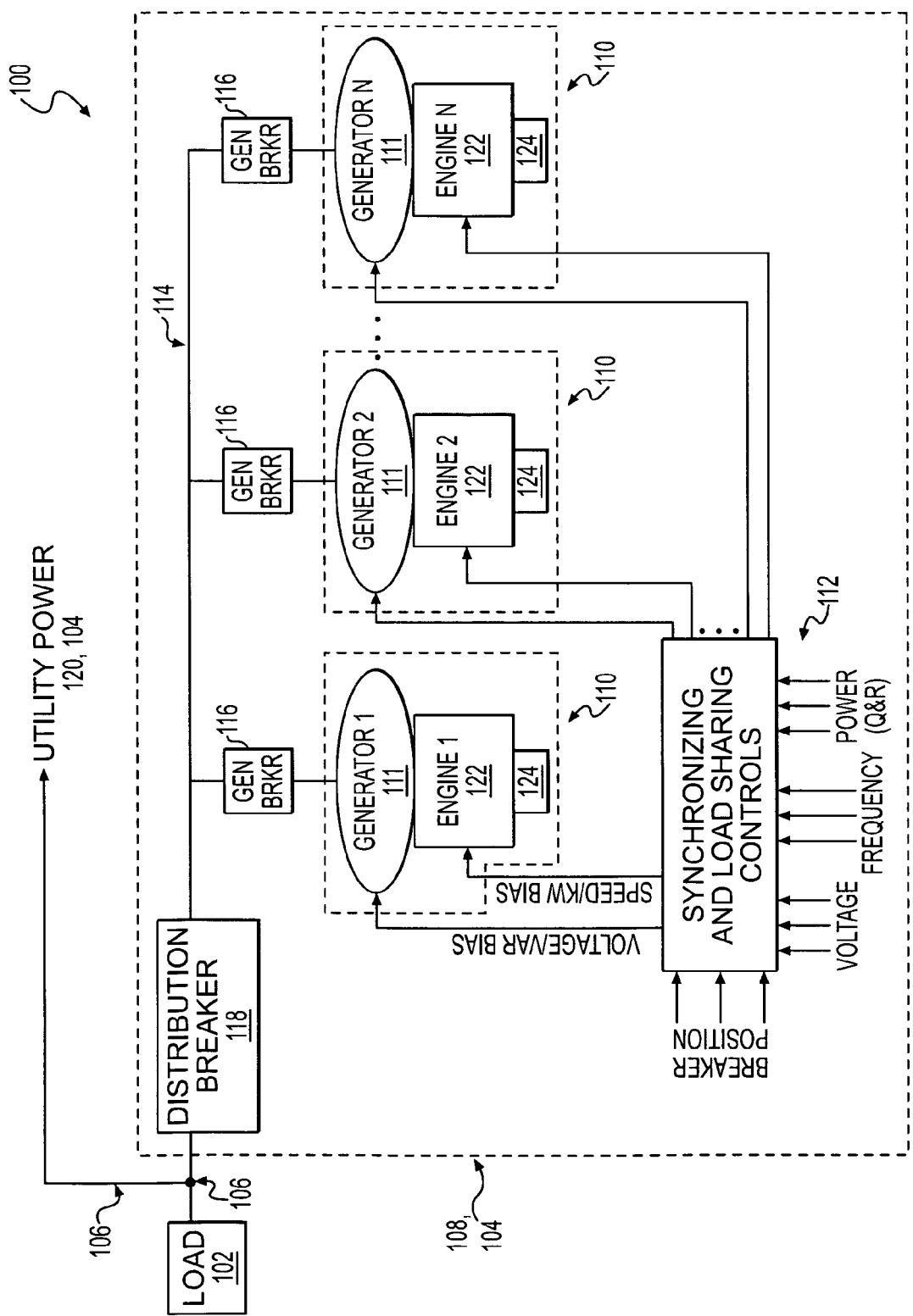
FIG. 1 is a schematic illustration of one exemplary embodiment of a power system according to the present disclosure.

FIG. 1 illustrates a power system 100 according to the present disclosure. Power system 100 may include an electric power load 102, power sources 104 operable to supply electricity, and a power-transmission network 106 for transferring electricity from power sources 104 to electric power load 102. Electric power load 102 may include any device or devices that require uninterrupted electricity to perform one or more tasks, including, but not limited to, electric lights and electric motors. Examples of locations with tasks requiring uninterrupted electricity may include, for example, hospitals, airports, computer servers, telecommunication installations, and industrial applications. In some embodiments, electric power load 102 may require electric power in a particular form, such as three-phase alternating current.

One type of power source 104 may be a generator-driven power source 108, and may be composed of one or more generator sets 110, generators 111, a synchronizing and load sharing control 112 to control generator-driven power source 108, a bus 114 to which each generator set 110 is connected, generator breakers 116 between a generator set 110 and bus 114, and a distribution breaker 118 to separate power-transmission network 106 and electric power load 102 from a generator-driven power source 108. Power-transmission network 106 may also be connected to utility power 120, another power source 104. Power sources 104 may include utility power 120, and a generator-driven power source 108. Utility power 120 may be, for example, an electricity generation and distribution system that supplies electricity to multiple customers for a fee. Utility power 120 may supply alternating electric current, such as three-phase alternating current with a frequency of, for example, 60 hertz or 50 hertz.

Generator-driven power source 108 may include any component or components operable to generate electricity. In some embodiments, generator-driven power source 108 may include generator sets 110. Each generator set 110 may include an engine 122 drivingly connected to a generator 111. Each engine 122 may be any type of device operable to produce mechanical power by combusting fuel, including, but not limited to, a diesel engine, a gasoline engine, a gaseous-fuel-driven engine, and a turbine engine. Each generator 111 may be any type of device configured to mechanically receive power from the associated engine 122 and convert at least a portion of that power into electricity, such as an AC synchronous generator, an induction generator, a permanent-magnet generator, or a switched-reluctance generator. In some embodiments, each generator set 110 may have a configuration such that it generates three-phase AC electricity. Additionally, in some embodiments, generator set 110 may have an electricity-generation capacity less than five megawatts.

Generator breaker 116 may be between the output of a generator set 110 and bus 114. Each generator breaker 116 may have any configuration that allows the electrical connection of the output of an associated generator set 110 to bus 114. Types of generator breakers are well known in the art.

Generator-driven power source 108 may also include various control components. For example, generator-driven power source 108 may have a synchronizing and load sharing control 112. Synchronizing and load sharing control 112 may include various types of information-processing components, including, but not limited to, hardwired control circuits (not shown) and/or microprocessors (not shown). Additionally, in some embodiments, synchronizing and load sharing control 112 may include an operator interface (not shown) through which an operator may communicate with synchronizing and load sharing control 112. Generator-driven power source 108 may have its synchronizing and load sharing control 112 operatively connected to all its engines 122, its generators 111, and its generator breakers 116. Accordingly, synchronizing and load sharing control 112 may monitor and/or control one or more aspects of the operation of all engines 122, generators 111, and generator breakers 116 of generator-driven power source 108. Synchronizing and load sharing control 112 may be operatively connected to distribution breaker 118 so that synchronizing and load sharing control 112 may control whether distribution breaker 118 electrically connects bus 114 to power-transmission network 106 and electric power load 102.

Generator set 110 may also include one or more information-processing devices. For example, generator set 110 may include an associated control device 124. Control devices 124 may include various types of information-processing components, including, but not limited to, hardwired control circuits (not shown) and/or microprocessors (not shown). Additionally, in some embodiments, control devices 124 may each include an operator interface (not shown) through which an operator may communicate with control device 124. Each generator set 110 may have its control device 124 operatively connected to its engine 122, its generator 111, and its generator breaker 116. Accordingly, control device 124 of each generator set 110 may monitor and/or control one or more aspects of the operation of engine 122, generator 111, and generator breaker 116 of that generator set 110.

Both synchronizing and load sharing control 112 and each control device 124 may also connect to various components that supply it with information associated with various other aspects of the operation of power system 100. Both synchronizing and load sharing control 112 and each control device 124 may receive information associated with one or more characteristics of the electricity generated by its generator sets 110, such as the voltage, current, phase, and/or frequency. Additionally, both synchronizing and load sharing control 112 and each control device 124 may receive information relating to the amount of power required by electric power load 102. For example, both synchronizing and load sharing control 112 and each control device 124 may receive information such as the voltage and/or current in one or more portions of bus 114, the voltage and/or current in one or more components of electric power load 102, and/or the operating states of one or more of the devices of electric power load 102. Both synchronizing and load sharing control 112 and each control device 124 may also communicate with one another over a communication network (not shown). Alternatively, synchronizing and load sharing control 112 may communicate with each control device 124 directly.

In some exemplary embodiments, synchronizing and load sharing control 112 may be the only controller present. In other exemplary embodiments, both synchronizing and load sharing control 112 and control device 124 may be present, and work cooperatively together. Alternatively, control devices 124 may be controlled by synchronizing and load sharing control 112. In further exemplary embodiments, control devices 124 may provide the control for the generator-driven power source 108 and generator sets 110, and each control device 124 may have a protocol for duty sharing and controlling the overall generator-driven power source 108.

Generator sets 110 are not limited to the configuration shown in FIG. 1. For example, generator sets 110 may include components other than engines 122 and generators 111 for producing electricity. In one exemplary embodiment, one or more of generator sets 110 may be fuel cells.

Bus 114 may include various electrical components operable to transmit power from generator sets 110 and generator breakers 116 to distribution breaker 118 to send to electrical power load 102. Closing a generator breaker 116 of a generator set 110 may electrically connect the output of generator 111 to bus 114. In one exemplary embodiment, generator-driven power source 108 may support an island mode application. In an island mode application, when utility power 120 is disconnected, distribution breaker 118 may be closed, which may connect bus 114 to power-transmission network 106 and electric power load 102. In this embodiment, generator-driven power source 108 may supply power to electric power load 102. In a further exemplary embodiment, generator-driven power source 108 may support a grid connected application. In a grid connected application, when utility power 120 is connected, distribution breaker 118 may be closed, which may connect bus 114 to power-transmission network 106 and electric power load 102. In this embodiment, generator-driven power source 108 may supplement utility power 120 to supply electric power load 102.

Both synchronizing and load sharing control 112 and each control device 124 may receive information associated with one or more characteristics of the electricity supplied by utility power 120, such as its voltage, current, phase, and/or frequency. Both synchronizing and load sharing control 112 and each control device 124 may receive similar information associated with the electricity flowing in power-transmission network 106, the characteristics of which may differ from the characteristics of the electricity supplied by utility power 120 in circumstances where distribution breaker 118 is open. Information associated with the electricity flowing in power-transmission network 106 and/or other information received by both synchronizing and load sharing control 112 and each control device 124 may serve as an indication to both synchronizing and load sharing control 112 and each control device 124 associated with the power to be provided to electric power load 102.

Power system 100 is not limited to the configuration shown in FIG. 1. For example, power system 100 may include different numbers and/or types of power sources 104 that can supply power to power-transmission network 106. In some exemplary embodiments, power system 100 may not have provisions for connecting electric power load 102 to utility power 120 and/or power system 100 may have a configuration that allows connecting either utility power 120 or another electric utility to electric power load 102. In other exemplary embodiments, power sources 104 may also include uninterrupted power supplies and solar power devices.

Synchronizing and load sharing control 112 and each control device 124 may also have a different configuration than that shown in FIG. 1. In some exemplary embodiments, one or more of control devices 124 and synchronizing and load sharing control 112 may be omitted. In such exemplary embodiments, generator-driven power source 108 may perform the control functions of the omitted control device(s) 124 with one or more of the remaining control devices 124 and/or with control devices 124 not shown in FIG. 1.

Synchronizing and load sharing control 112 and each control device 124 may also include additional components for controlling how power flows within bus 114. For example, in some embodiments, synchronizing and load sharing control 112 and control devices 124 may include one or more switches or breakers in power-transmission network 106 for selectively isolating groups of power sources 104, such as groups of generator sets 110, from electric power load 102. When at least one generator breaker 116 is closed and its associated generator set 110 is connected electrically to bus 114 as the reference power source, then the other generator sets 110 may begin to synchronize to bus 114. Once synchronized, the other generator sets 110 may close onto the now live bus 114, and proceed to share the load. In a further embodiment, utility power 120 may be the reference power source when distribution breaker 118 is closed and utility power 120 is present.

Electrically connecting an additional generator set 110 to an existing bus 114 may dictate that the voltage, frequency, and phase angle output of generator set 110 corresponds to that of bus 114. This may result in a smoother transition and a lower level of shock to generator set 110 and electric power load 102. Additionally, in one exemplary embodiment, frequency and phase control of generator set 110 may not begin until the frequency of generator set 110 has closed to within a certain amount of the frequency of bus 114. If the frequency difference between generator set 110 and bus 114 is greater than, for example, between one Hz and ten Hz, frequency and phase control of generator set 110 may not be initiated. In other exemplary embodiments, frequency control of generator set 110 may be initiated at any point during the process of matching generator set 110 with bus 114.

Figure 2:
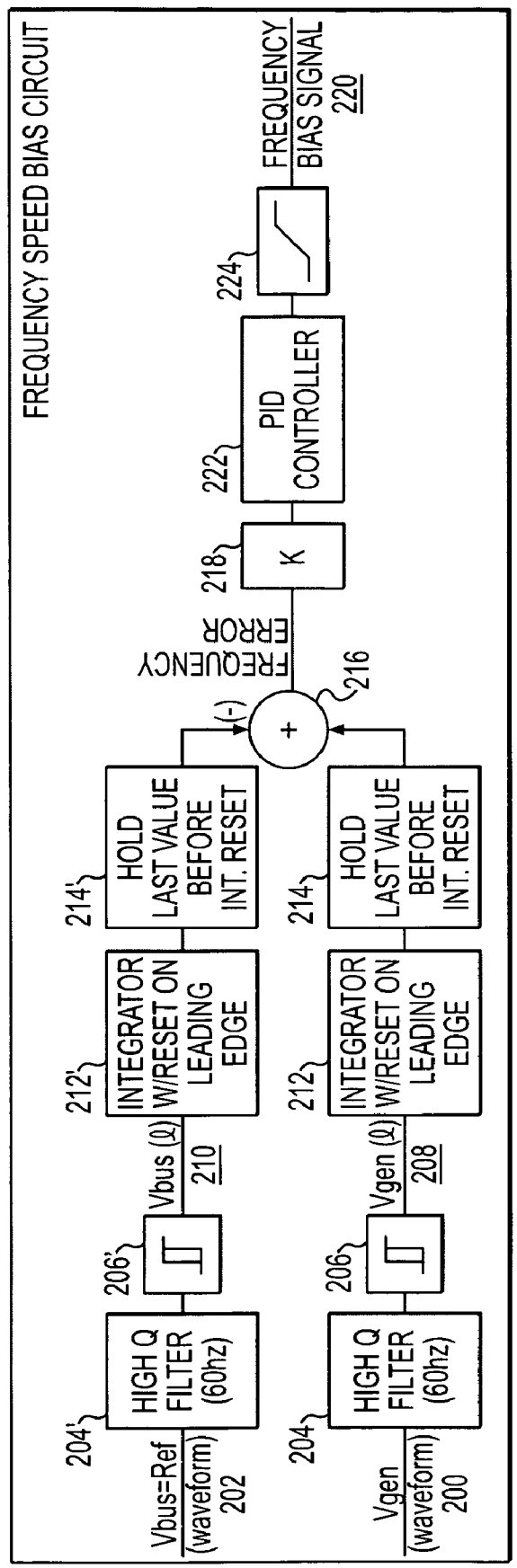
FIG. 2 is a diagrammatic illustration of one exemplary embodiment of a frequency speed bias circuit and method of generating a frequency speed bias for a power system according to the present disclosure.

For illustration, an exemplary single-phase embodiment is described, but the method may be directly applicable to three-phase power systems 100 or power systems 100 with other configurations. In FIG. 2, a frequency speed bias circuit may be shown. Vgen 200 may be the voltage waveform from a generator set 110 and Vbus 202 may be the voltage waveform from a bus 114. A filter scheme may be used to reject frequencies except for those near the base electrical frequency (50/60 Hz). In one exemplary embodiment, High-Q bandpass filters 204 and 204' may be used, and in another exemplary embodiment, lowpass filters (not shown) may be used. Filter schemes to pass a specific range of frequencies are well known in art.

The output of the filter scheme may be a clean sinusoidal waveform that may be converted into a logic signal. One exemplary embodiment may use hard limiters 206 and 206' (sinusoidal waveform becomes a square waveform). In another exemplary embodiment, a small amount of hysteresis may be introduced to avoid false zero crossings associated with residual noise in the waveform. In another exemplary embodiment, an alternate approach may be to use phase-lock-loops to detect the fundamental frequency. From any embodiment, the resulting logic signals Vgen(1) 208 and Vbus(1) 210 may be used to synchronize generator set 110 to bus 114. The logic signals Vgen(1) 208 and Vbus(1) 210 created from the AC waveform may take a value of "1" during the positive portion of the frequency cycle, and a value of "0" during the negative portion of the frequency cycle. A leading edge may occur when the AC waveform crosses zero during the transition from negative to positive.

Integrators (integrator/accumulator block) 212 and 212' may receive the logic signals Vgen(1) 208 and Vbus(1) 210, and may increase their output for as long as the inputted logic signal is high (value of 1). The output of integrators 212 and 212' may remain constant when the inputted logic signal is low (value of 0). Integrators 212 and 212' output may reset to a zero value when a leading edge (transition from 0 to 1) appears on the inputted logic signal. This may occur once for each frequency cycle. Integrators are well known in the art, and in various exemplary embodiments may be implemented with analog circuits, with logic circuits, or with a microprocessor.

Hold blocks 214 and 214' may retain the last value of integrators 212 and 212' output just before being reset, and hold blocks 214 and 214' may update each cycle. Hold blocks are well known in the art, and in various exemplary embodiments may be implemented with analog circuits, with logic circuits, or with a microprocessor. A summer 216 may combine the maximum outputs of hold blocks 214 and 214' associated with Vgen 200 and Vbus 202 to determine the difference between them and to create a signal proportional to the relative frequency mismatch. First weight factor K 218 may be applied to the signal proportional to the relative frequency mismatch. The signal proportional to the relative frequency mismatch may be multiplied by K. K may be a number between zero and one, and K is determined by the size of the frequency error between generator set 110 and bus 114. A first PID controller 222 may generate a frequency speed bias 220 for generator set 110. A signal limiter 224 also may be introduced to restrict the amount of instantaneous change that frequency speed bias 220 may apply to the speed of an engine 122 of a generator 111.

Figure 3:
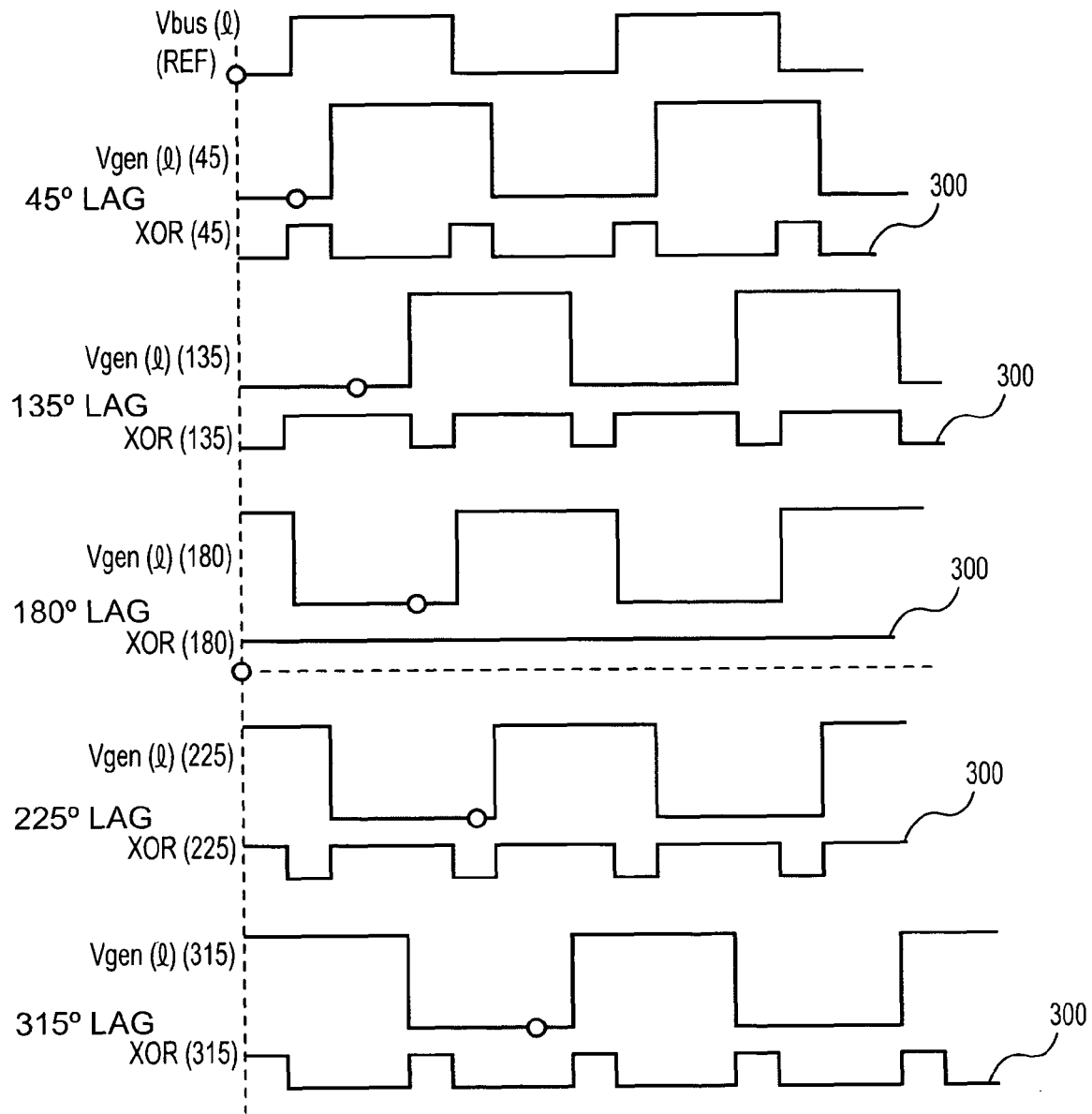
FIG. 3 is pictorial illustration of timing diagrams for phase synchronization of a generator to a bus.

FIG. 3 shows timing signals for two logic waveforms that may correspond to Vbus 202 and Vgen 200. In the exemplary embodiments in FIG. 3, the frequencies of Vgen 200 and Vbus 202 may have a close correspondence in terms of frequency, but there may be a significant phase shift between Vgen 200 and Vbus 202 (shown for 45, 135, 180, 225, and 315 degree lag between Vgen 200 and Vbus 202). A relative measure of the alignment between the two signals may be obtained using an XOR logic function. XOR output 300 may be high (value of 1) when Vgen(1) 208 and Vbus(1) 210 are different, and low (value of 0) otherwise. The duty cycle of the XOR waveform may increase as the phase shift between Vgen(1) 208 and Vbus(1) 210 increases. When Vgen(1) 208 and Vbus(1) 210 are 180 degrees out of phase (while both are at the same frequency), the XOR duty cycle may peak at 100 percent. Further lag between Vgen(1) 208 and Vbus(1) 210 may lead to a reduction in the XOR duty cycle. This is because 315 degrees lagging is equivalent to 45 degrees leading, and Vgen(1) 208 and Vbus(1) 210 may be in closer angular alignment than a magnitude of 315 degrees in phase difference may indicate. This may provide an indication as to which direction Vgen 200 ought to be biased (advance or retard) to reduce the amount of phase shift with Vbus 202.

Figure 4:
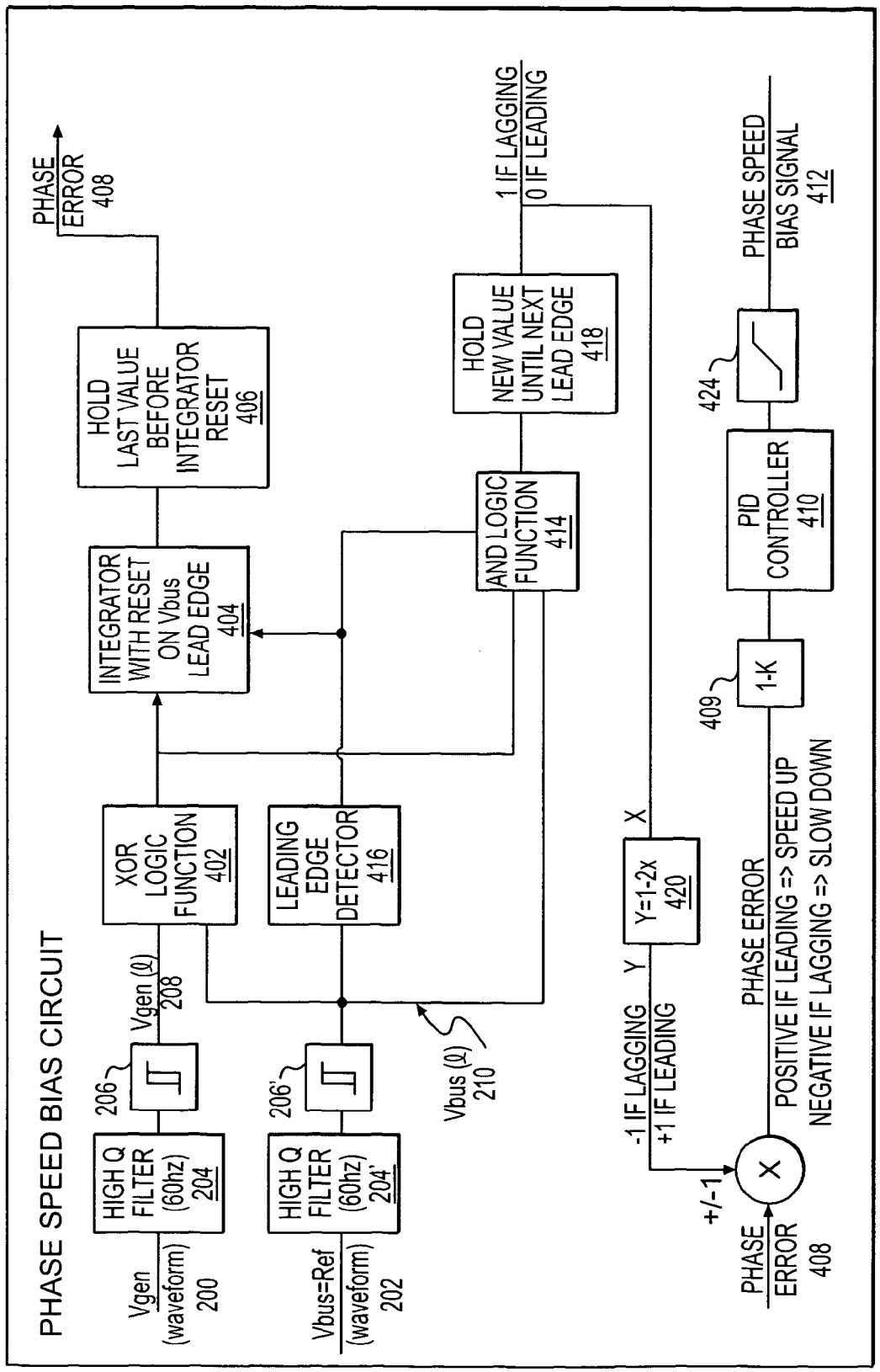
FIG. 4 is a diagrammatic illustration of one exemplary embodiment of a phase speed bias circuit and method of generating a phase speed bias for a power system according to the present disclosure.

In FIG. 4, an exemplary embodiment of a phase speed bias circuit is shown in which phase alignment may be achieved. The AC waveforms from generator set 110 and bus 114 voltages (Vgen 200 and Vbus 202) may be used to generate logic signal Vgen(1) 208 and Vbus(1) 210 as described in FIG. 2. Vgen(1) 208 and Vbus(1) 210 may be inputted into XOR logic function block 402. XOR logic function blocks are well known in the art, and in various exemplary embodiments may be implemented with logic circuits, or with a microprocessor.

The output of the XOR logic function block 402 may be inputted into an integrator (integrator/accumulator block) 404 to calculate the duty cycle of the XOR waveform. Integrator 404 output may be reset upon detecting the leading edge of Vbus(1) 210. Integrators are well known in the art, and in various exemplary embodiments may be implemented with analog circuits, with logic circuits, or with a microprocessor.

Hold block 406 may provide the last value of the XOR duty cycle just prior to integrator 404 reset, and hold block 406 may be updated at the end of each cycle for Vbus 202. The value held by hold block 406 may be proportional to phase error 408 between Vgen 200 and Vbus 202. Hold blocks are well known in the art, and in various exemplary embodiments may be implemented with analog circuits, with logic circuits, or with a microprocessor.

Phase error 408, outputted by hold block 406, may be inputted into a second weight factor 1-K 409. Phase error 408 may be multiplied by 1-K. 1-K may be a number between zero and one. K is determined by the size of the frequency error between generator set 110 and bus 114, and 1-K increases in value as the frequency error becomes smaller. It should be understood that 1-K and K may be related in a number of different ways, not just arithmetically as: 1−(1−K)=K. The relationship is not limited to an algebraic one, but also includes any set of relationships where as K increases, 1-K decreases, and the maximum value for K is one and the maximum value for 1-K is also one. The weighted phase error outputted by second weight factor 1-K 409 may be inputted into second PID controller 410 that generates a phase speed bias 412 to speed-up, or slowdown, generator set 110. Phase error 408 is proportional to the relative phase mismatch between Vgen 200 and Vbus 202. If Vgen 200 is lagging Vbus 202 by 180 degrees or less, phase error 408 may be set to a negative value to decrease the output of phase speed bias 412. Conversely, if Vgen 200 leads Vbus 202 by less than 180 degrees, phase error 408 may be set to a positive value to increase the output of phase speed bias 412.

As shown in FIG. 3, for the lagging cases, the XOR logic signal is high immediately following the rising edge on Vbus (1) 210. When Vgen 200 leads Vbus 202 (or lags by more that 180 degrees) the XOR logic signal is low immediately following the leading edge occurrence on Vbus(1) 210. The lag or lead signal may be implemented in logic using AND logic function block 414 with logic signal Vbus(1) 210 and XOR logic function 402 output as inputs, and the leading edge detector 416 output (logic 1 when detected and 0 otherwise) as the enabler to the output update. AND logic function blocks are well known in the art, and in various exemplary embodiments may be implemented with logic circuits, or with a microprocessor.

Hold block 418 may retain the logic value output of AND logic function block 414 until the next leading edge on Vbus (1) 210 is detected. Hold block 418 may have an output of "0" if Vgen 200 leads Vbus 202, and "1" if Vgen 200 lags Vbus 202. The sign of phase error 408 may, in one exemplary embodiment, be produced by algebraic relationship 420, and in another exemplary embodiment, by a logic table. The sign of phase error 408 is negative if Vgen 200 lags Vbus 202, and positive if Vgen 200 leads Vbus 202. The signed phase error signal (multiplied by 1-K) goes into a second PID controller 410 to generate phase speed bias 412 for generator set 110. A signal limiter 424 also may be introduced to restrict the range of influence phase speed bias 412 may have on the speed of engine 122 of generator set 110.

Figure 5:
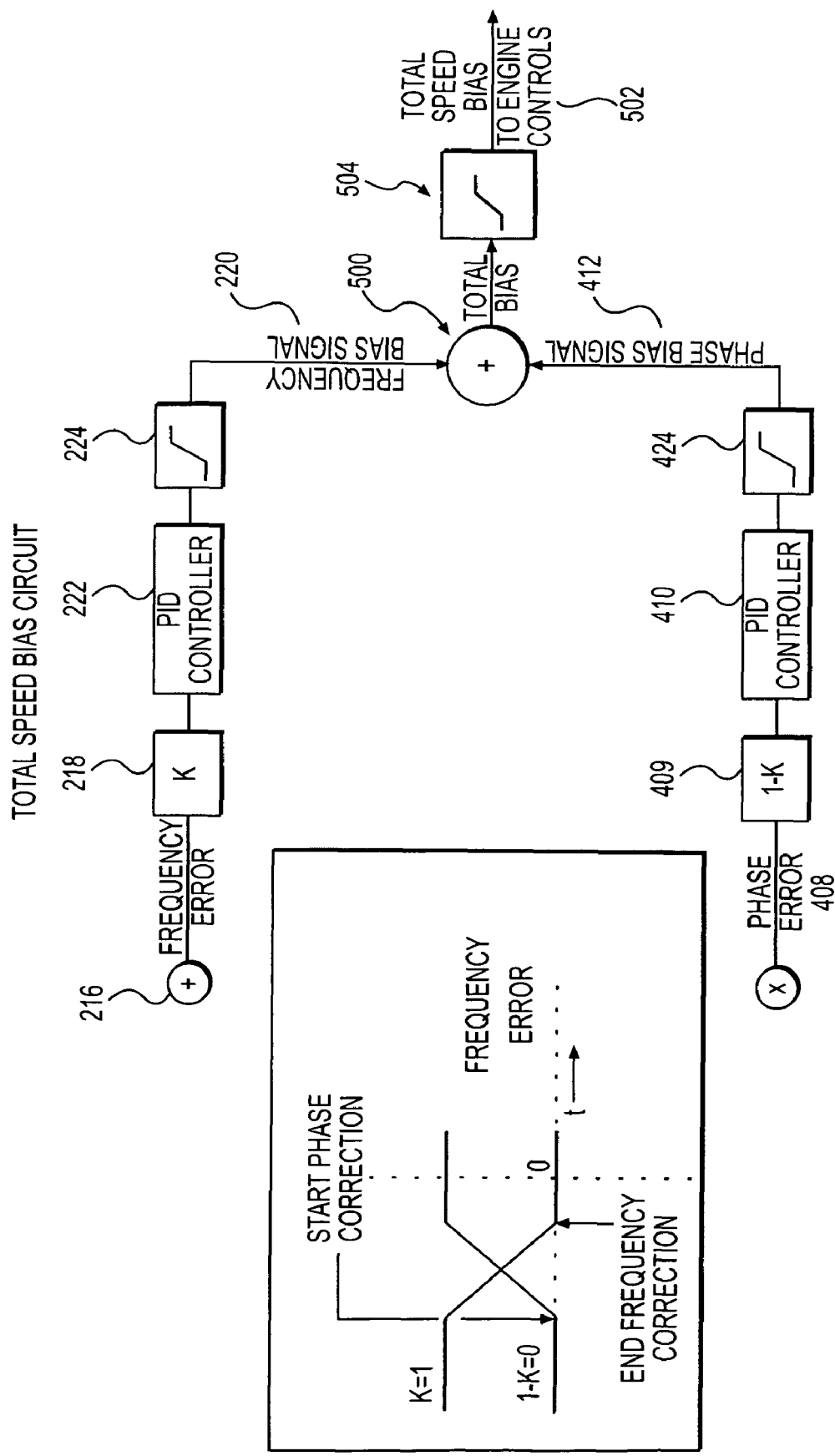
FIG. 5 is a diagrammatic illustration of one exemplary embodiment of a total speed bias circuit and method of generating a total speed bias for a power system according to the present disclosure.

In FIG. 5, a total speed bias circuit may be shown. To achieve complete synchronization between Vgen 200 and Vbus 202, Vgen 200 and Vbus 202 should have close correspondence both in frequency and phase angle. The preceding discussions have presented exemplary methods for achieving frequency and phase matching separately. These methods may be combined to simultaneously drive both frequency and phase into alignment.

As already discussed on FIG. 2, a summer 216 may output a signal proportional to the relative frequency mismatch between Vgen 200 and Vbus 202. First weight factor K 218 may be applied to the signal proportional to the relative frequency mismatch. The signal proportional to the relative frequency mismatch may be multiplied by K. A first PID controller 222 may generate a frequency speed bias 220 for generator set 110. A signal limiter 224 also may be introduced to restrict the amount of instantaneous change that frequency speed bias 220 may apply to the speed of an engine 122 of a generator 111.

Additionally, as already discussed in FIG. 4, phase error 408 may be inputted into a second weight factor 1-K 409. Phase error 408 may be multiplied by 1-K. The signed phase error signal (multiplied by 1-K) may be inputted into a second PID controller 410 to generate phase speed bias 412 for generator set 110. A signal limiter 424 also may be introduced to restrict the range of influence phase speed bias 412 may have on the speed of engine 122 of generator set 110.

Frequency speed bias 220 and phase speed bias 412 may be added by summer 500 to generate a total speed bias 502. Tuning may be required so outputs of first PID controller 222 and second PID controller 410 work in a complementary manner. In one exemplary embodiment, proper selection of the gains within first PID controller 222 and second PID controller 410 may be used to prevent opposing signals being sent, such as speed up and slow down. In another exemplary embodiment, one of the one or more biases may be constrained to prohibit or minimize the contribution to the overall synchronization signal until certain criteria are met. For example, frequency speed bias 220 may be ignored until the frequencies for Vgen 200 and Vbus 202 match within a predetermined amount, e.g., within ten percent of the frequency of Vbus 202. As a second example, phase speed bias 412 may be ignored until the frequencies for Vgen 200 and Vbus 202 match within a predetermined amount, e.g., within five percent of the frequency of Vbus 202. As a third example, phase speed bias 412 may be ignored until the frequencies for Vgen 200 and Vbus 202 match within a predetermined amount, e.g., within one percent of the frequency of Vbus 202. Once frequency speed bias 220 and phase speed bias 412 are added by summer 500 to generate a total speed bias 502, a signal limiter 504 may be introduced to restrict the range of influence total speed bias 502 may have on the speed of engine 122 of generator set 110.

In one exemplary embodiment, K and 1-K may be used to constrain both biases 220 and 412, in an interrelated manner. When K equals one, 1-K must equal zero, and vice versa. When K is equal to one or zero, one of the two biases 220 and 409 is inactive, and only the other bias is used to generate the total speed bias 502. Likewise, as K decreases from one, frequency bias signal 220 is proportionally reduced, and phase bias signal 412 is proportionally increased. When K is greater than 0.5, frequency speed bias 220 is more heavily weighted than phase speed bias 412, and vice versa. When the frequency error is above a minimum value, such as between five Hz and one Hz, K is set equal to one, and only frequency bias signal 220 is used to determine total speed bias 502. When the frequency error is below a minimum value, such as between one Hz and 0.1 Hz, K is set equal to zero, and only phase bias signal 412 is used to determine total speed bias 502.

Figure 6:
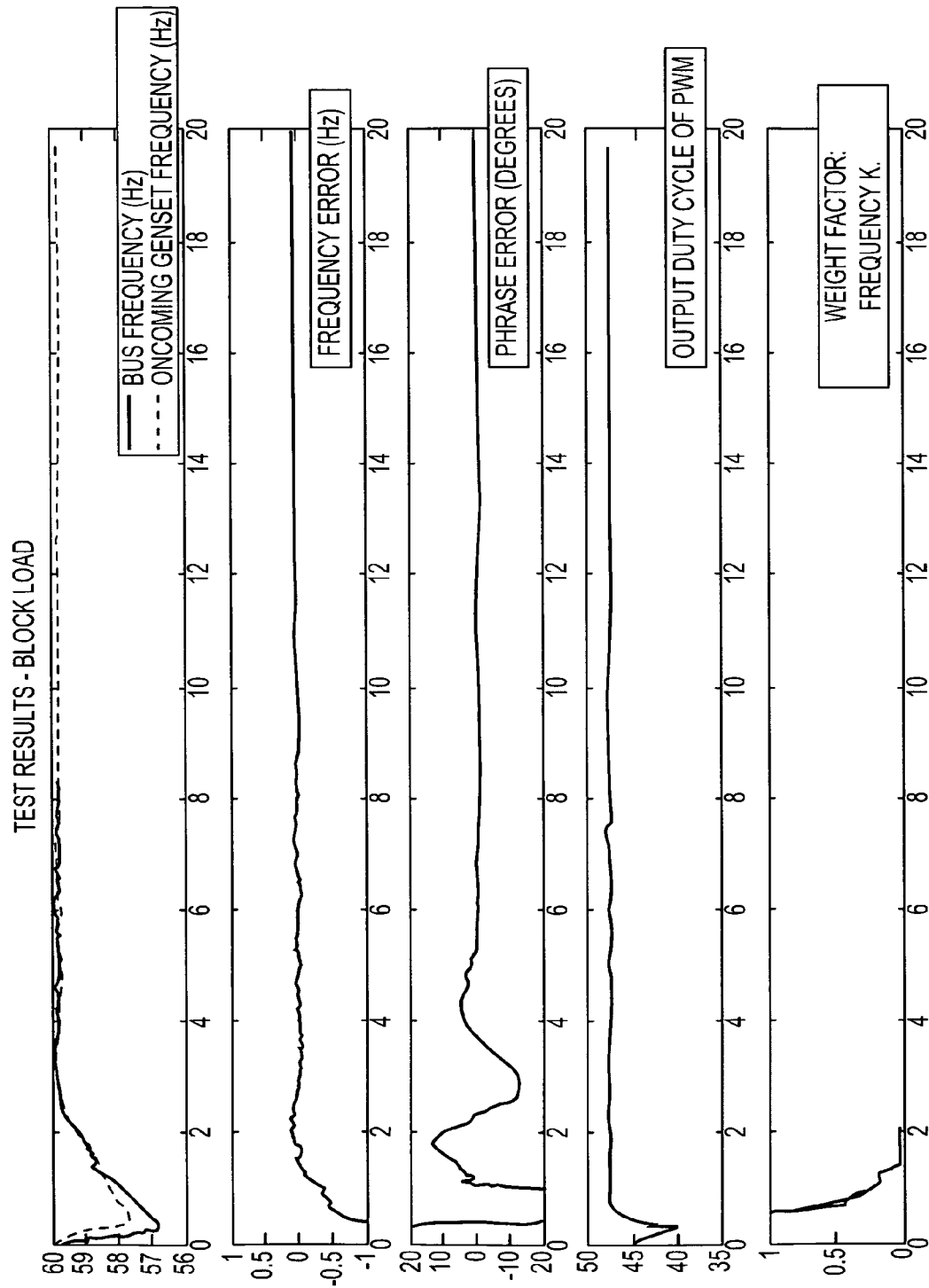
FIG. 6 is a diagrammatic illustration of five graphs of an exemplary response of the frequency responses, frequency error, phase error, output duty cycle, and weight factor K of a generator set, according to the present disclosure.

FIG. 6 illustrates five exemplary graphs of the frequency responses, frequency error, phase error, output duty cycle, and weight factors K of a generator set, according to the present disclosure. All the graphs' horizontal axes may measure time in seconds. The graphs illustrate the response of a bus 114 in island mode when a large load is introduced, such as an induction motor. Generator set 110 is brought online to help share the additional load. As shown in the first graph, the frequency of bus 114 may decrease initially as generator sets 110 already on bus 114 adjust to the new load. The frequency of generator set 110 being brought online may also decrease as total speed bias 502 applied to generator set 110 causes its frequency to chase the frequency of bus 114.

As shown in the second graph, frequency error 216 starts out at over 1 Hz, and within 2 seconds, approaches zero as the frequency of generator set 110 closes in on the frequency of bus 114. At the same time, as shown in the third graph, phase error 408 is uncontrolled until correction is applied after 0.5 seconds. The phase of generator set 110 is controlled once K is reduced below one, as shown in the fifth graph. At that point, the phase error 408 may begin to be reduced, eventually approaching zero. The phase of generator set 110 is matched to bus 114 at a little over 4 seconds. For illustrative purposes, the output duty cycle of generator set 110 is illustrated in graph four.

The fifth graph illustrates the value of the first weight factor 218 (the second weigh factor 409 is not shown but it is numerically equal to 1-K.). Until the frequency error is under some first frequency error value, first weight factor K 218 is set to one. When K is set to one, 1-K may equal zero, phase bias signal 412 remains inactive (typically set to zero), and only frequency bias signal 220 is used to generate the total speed bias 502. K may be set to one until the frequency error is under some first frequency error value. The first frequency error value may be between five Hz and 0.5 Hz. In one exemplary embodiment, the first frequency error value may be one Hz. K may be set to zero until the frequency error is over some second frequency error value. The second frequency error value may be between one Hz and 0.1 Hz. In one exemplary embodiment, the second frequency error value may be 0.5 Hz. Once the frequency error output by summer 216 is less than the first frequency error value, K may be less than one, the phase bias signal 412 may no longer be inactive, and total speed bias 502 may start to adjust the phase of generator set 110.

As the frequency error approaches zero, the value of K may continue to be reduced, and the weight of phase bias signal 412 continues to increase, until all of total speed bias 502 is based on only phase bias signal 412. A linear change in K may be used, or a nonlinear relationship between the proportion of frequency error and phase error. In one exemplary example, once frequency error is under between 0.3 Hz and 0.1 Hz, and phase angle error is under between 20 degrees and 10 degrees, generator set 110 may be ready for connection to bus 114.

Figure 7:
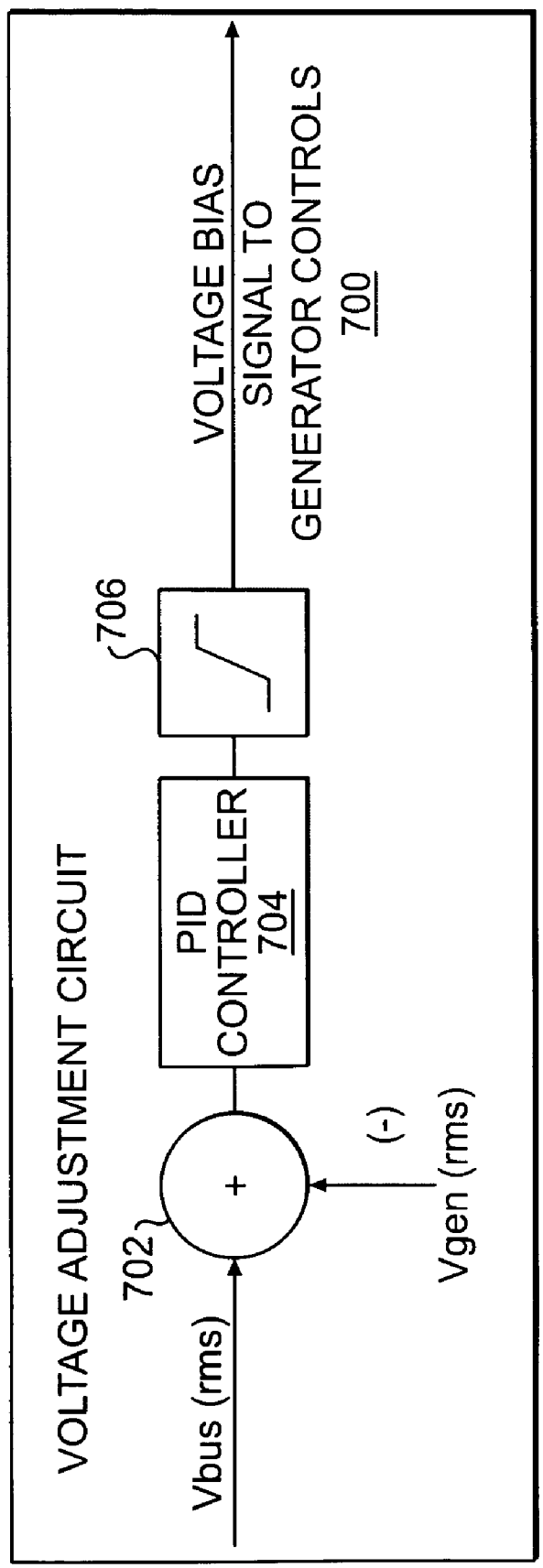
FIG. 7 is a diagrammatic illustration of one exemplary embodiment of a voltage adjustment bias circuit and method of generating a voltage bias for a power system according to the present disclosure.

FIG. 7 illustrates an exemplary voltage adjustment circuit. A voltage bias signal 700 may be generated by a voltage regulator. Vgen 200 and Vbus 202 may be summed by summer 702 to determine the difference. The difference may be inputted into voltage PID controller 704 which may, in turn, output a voltage bias signal 700. A signal limiter 706 may be introduced to restrict the rate of change of the voltage caused by voltage bias signal 700 on generator 111. Circuits and methods to generate a voltage bias signal are well known in the art.

Synchronization conditions may dictate that the voltage, phase, and frequency of Vgen 200 be within a permissible range of the voltage, phase, and frequency of Vbus 202. A permissible range may be the difference between a parameter for Vgen 200 and Vbus 202 compared to Vbus 202, and the difference may be a small percentage of Vbus 202, e.g., from 0.1 percent to ten percent, depending on requirements for said parameter. Once synchronization conditions have been met, a breaker close command may be issued by either synchronizing and load sharing control 112 or control device 124 to generator breaker 116, and after a brief actuation delay, generator breaker 116 may close.

The above-described actions may be repeated for each generator set 110 that is to be synchronized with bus 114, and the various actions may be normally overseen and coordinated by synchronizing and load sharing control 112 and/or control devices 124.

Industrial Applicability

Power system 100 may have application wherever an electric power load 102 exists. During operation of power system 100, synchronizing and load sharing control 112 or control device 124 may control which of utility power 120 and/or generator sets 110 in generator-driven power source 108 supplies electricity to electric power load 102 based on operator inputs and/or various operating conditions of power system 100. In some circumstances, synchronizing and load sharing control 112 or control device 124 may maintain generator breakers 116 open to electrically disconnect generator sets 110 from bus 114. Synchronizing and load sharing control 112 or control device 124 may maintain distribution breaker 118 open to disconnect generator-driven power source 108 from electric power load 102. For example, synchronizing and load sharing control 112 or control device 124 may maintain distribution breaker 118 open when it is desirable to supply the power needs of electric power load 102 exclusively with electricity from utility power 120 or when electric power load 102 does not require electricity. Generator-driven power source 108 and synchronizing and load sharing control 112 or control device 124 may allow generator sets 110 to be added to bus 114 without excessive shock on generator set 110 or electric power load 102 when used to supply additional electrical power to bus 114 or electric power load 102.

FIG. 2 may show the first requirement for synchronization of a generator set 110 and bus 114. It may not be necessary to start frequency synchronization until generator set 110 and bus 114 are within a certain frequency of each other, such as between two Hz and five Hz. Vgen 200 and Vbus 202 may be the voltage signals from generator set 110 and bus 114. Vgen 200 and Vbus 202 may be manipulated to create a frequency speed bias 220 for generator set 110. In one exemplary embodiment, High-Q bandpass filters 204 and 204', or in alternate embodiments, a similar filtering scheme, may be used to reject frequencies except for those near the base electrical frequency (50/60 Hz).

The result of the filtering scheme may be a clean sinusoidal waveform that can be converted into a logic signal Vgen(1) 208 or Vbus(1) 210 using hard limiters 206 and 206', or in alternate embodiments, a similar scheme to convert a sinusoidal waveform into a square waveform. In another alternate exemplary embodiment, a small amount of hysteresis may be introduced to avoid false zero crossings associated with residual noise in the waveform. A further alternate embodiment may be to use phase-lock-loops to detect the fundamental frequency. The resulting logic signals Vgen(1) 208 and Vbus(1) 210 may be used to synchronize generator set 110 to bus 114. The logic signal Vgen(1) 208 and Vbus(1) 210 created from the AC waveform may take a value of "1" during the positive portion of the frequency cycle, and a value of "0" during the negative portion of the frequency cycle. A leading edge occurs when the AC waveform crosses zero during the transition from negative to positive.

Integrators 212 and 212' may receive the logic signal Vgen (1) 208 and Vbus(1) 210, and may increase their output for as long as the inputted logic signal is high (value of 1). The output will remain constant when the inputted logic signal is low (value of 0). Integrators 212 and 212' output may reset to a zero value when a leading edge (transition from 0 to 1) appears on Vgen(1) 208 and Vbus(1) 210 for integrators 212 and 212' associated with Vgen 200 and Vbus 202 respectively. This may occur once for each frequency cycle.

Hold blocks 214 and 214' may retain the last value of integrator 212 or 212' output just before being reset, and hold blocks 214 and 214' may update each cycle. The outputs of hold blocks 214 and 214' may be proportional to the period of the inputted AC waveform. In other words, higher values stored in hold blocks 214 and 214', correspond to lower frequencies. Comparing the two values of hold blocks 214 and 214' for Vgen 200 and Vbus 202, respectively, may give a measurement of relative mismatch between the frequencies of Vgen 200 and Vbus 202. A synchronization objective may be to drive this difference to zero. Additionally, first weight factor K 218 may reduce the value of the relative mismatch between the frequencies of Vgen 200 and Vbus 202, but not change the sign of the relative mismatch between the frequencies of Vgen 200 and Vbus 202. Since Vbus 202 is the reference signal (to be synchronized to), the speed of engine 122 of generator set 110 may be increased, or decreased, so that the frequency of Vgen 200 may match that of Vbus 202. This may be accomplished through first PID controller 222 by generating a frequency speed bias 220 for generator set 110. For example, if the frequency of Vgen 200 is higher than that of Vbus 202, the output associated with Vgen 200 entering into summer 216 may be smaller than that associated with Vbus 202, creating a negative frequency error which may decrease the output of first PID controller 222. If the output of first PID controller 222 is decreased, the speed of engine 122 of generator set 110 may be decreased, lowering generator set 110 electrical frequency. Conversely, if the frequency of Vgen 200 is lower than that of Vbus 202, the opposite occurs, increasing generator set 110 frequency. A signal limiter 224 may also be introduced to restrict the range of influence that frequency speed bias 220 may have on the speed of engine 122 of generator set 110. This may prevent engine 122 overspeed/underspeed conditions (over/under frequency protection).

For synchronization, it may be appropriate that the phase angles of the synchronized waveforms be in alignment. FIG. 3 shows timing signals for two logic waveforms, Vgen(1) 208 and Vbus(1) 210, which may correspond to Vgen 200 and Vbus 202. Even if the two frequencies have a close correspondence in terms of frequency, there may be significant phase shift between them (shown for 45, 135, 180, 225, and 315 degree lag between Vgen 200 and Vbus 202). A relative measure of the alignment between the two signals can be obtained using XOR logic function block 402. XOR output 300 may be high (value of 1) when the two inputs are different, and low (value of 0) otherwise. The duty cycle of the XOR waveform may increase as the phase shift between the two waveforms Vgen 200 and Vbus 202 increases. When they are 180 degrees out of phase (with both at the same frequency), the XOR duty cycle may peak at 100 percent. Further lag between Vgen 200 and Vbus 202 may lead to a reduction in XOR duty cycle. Lagging of 315 degrees may be equivalent to leading by 45 degrees, and the signals Vgen 200 and Vbus 202 may be in closer angular alignment than a magnitude of 315 degrees in phase difference may indicate. The timing of when the XOR duty cycle is high may give an indication of which direction to bias (advance or retard) Vgen 200 to reduce the amount of phase shift with Vbus 202.

In FIG. 4, an exemplary embodiment in which phase alignment may be achieved is shown. The AC waveforms from generator set 110 and bus 114 voltages (Vgen 200 and Vbus 202) may be used to generate logic signal Vgen(1) 208 and Vbus(1) 210 as described in FIG. 2. The signals Vgen(1) 208 and Vbus(1) 210 may be inputted into XOR logic function block 402.

The output of the XOR logic function block 402 may be inputted into an integrator 404 to calculate the duty cycle of the XOR waveform. Integrator 404 output may be reset upon detecting the leading edge of Vbus(1) 210. Hold block 406 may provide the last value of the XOR duty cycle just prior to integrator 404 reset, and hold block 406 may be updated at the end of each cycle for Vbus(1) 210. The output of hold block 406 may be proportional to phase error 408 between Vgen 200 and Vbus 202.

Phase error 408 may be multiplied by second weight factor 1-K 409. The result then may be inputted into a second PID controller 410 that may generate a phase speed bias 412 to speed up, or slow down, engine 122 of generator set 110. If Vgen 200 is lagging Vbus 202 by 180 degrees or less, phase error 408 may be set to a negative value to decrease the output of phase speed bias 412. This may tend to speed up engine 122 of generator set 110, allowing the phase of Vgen 200 to catch up to the phase of Vbus 202, and reduce the amount of phase shift between them. If Vgen 200 leads Vbus 202 by less than 180 degrees, phase error 408 may be set to a positive value, and the speed of engine 122 of generator set 110 may increase so that the phase of Vgen 200 corresponds to the phase of Vbus 202, reducing the phase shift angle between them.

The timing diagrams on FIG. 3 provide valuable information for determining whether Vgen 200 may be leading, or lagging, Vbus 202. For the lagging cases, the XOR logic signal may be high immediately following the rising edge on Vbus(1) 210. When Vgen 200 lead Vbus 202 (or lags by more than 180 degrees), the XOR logic signal may be low immediately following the leading edge occurrence on Vbus(1) 210. In one exemplary embodiment, the lag or lead circuit may be implemented in logic using AND logic function block 414 with logic signal Vbus(1) 210 and XOR logic function block 402 output as inputs, and the leading edge detector 416 output (logic 1 when detected and 0 otherwise) as the enabler to the output update.

Hold block 418 may retain the logic value until the next leading edge on Vbus(1) 210 is detected. The output of hold block 418 may be "0" if Vgen 200 leads Vbus 202, and "1" if Vgen 200 lags Vbus 202. The sign of phase error 408 may, in one exemplary embodiment, be produced by algebraic relationship 420, and in another exemplary embodiment, a logic table. Either embodiment may be used to produce the sign of phase error 408 (positive if Vgen 200 leads Vbus 202, and negative if Vgen 200 lags Vbus 202). The signed phase error signal may then be multiplied by second weight factor 1-K 409. The result then may be inputted into second PID controller 410 to generate phase speed bias 412 to be inputted into generator set 110 speed controller. Speeding up, or slowing down, engine 122 of generator set 110 may allow one signal to corresponds to the other, and bring them into phase alignment. A signal limiter 424 may also be introduced to restrict the range of influence phase speed bias 412 may have on the speed of engine 122. This may prevent engine 122 overspeed/underspeed conditions (over/under frequency protection).

In FIG. 5, complete synchronization between Vgen 200 and Vbus 202 may dictate a close correspondence in terms of frequency and phase angle. The preceding discussions have presented methods which may achieve frequency and phase matching separately. These two methods may be combined to simultaneously, or in a complementary way, drive both frequency and phase into alignment between Vgen 200 and Vbus 202. The derived frequency speed bias 220 and phase speed bias 412 may be added to generate a total speed bias 502. Given that this cumulative bias action includes two separate biases, it is expected that first PID controller 222 and second PID controller 410 may require some level of tuning so that the individual bias actions are complementary and not opposed to each another. In one exemplary embodiment, selection of the gains within first PID controller 222 and second PID controller 410 may be used to prevent opposing signals being sent that partially cancel each other. In another exemplary embodiment, one or more of the biases may be constrained to prohibit or minimize contribution to the overall synchronization signal until certain criteria is met. In one exemplary embodiment, first and second weight factors 218 and 409 may be used to control what proportion of total speed bias 502 is based on frequency bias signal 220 and what proportion is based on phase bias signal 412. For example, frequency speed bias 220 may be ignored until the frequencies for Vgen 200 and Vbus 202 match within a predetermined amount, e.g., within ten percent of the frequency of Vbus 202. As a second example, phase speed bias 412 may be ignored until the frequencies for Vgen 200 and Vbus 202 match within a predetermined amount, e.g., within five percent of the frequency of Vbus 202. As a third example, phase speed bias 412 may be ignored until the frequencies for Vgen 200 and Vbus 202 match within a predetermined amount, e.g., within one percent of the frequency of Vbus 202. A signal limiter 504 may be introduced to restrict the range of influence total speed bias 502 may have on the speed of engine 122 of generator set 110. This may prevent engine 122 overspeed/underspeed conditions (over/under frequency protection).

Vgen 200 and Vbus 202 may be synchronized in both frequency and phase, with the voltage levels corresponding for a smooth power transfer after a generator breaker 116 is closed. It may be desirable for Vgen 200 voltage to be slightly higher than the Vbus 202 voltage by a predetermined amount, so that power may be transferred from generator set 110 to bus 114 (positive power transfer) once generator breaker 116 is closed. As shown in FIG. 7, this may be achieved by introducing a voltage bias signal 700 to generator 111. Once the synchronization conditions have been met, generator breaker 116 may close, and the synchronization algorithm may no longer run since generator set 110 is electrically connected to bus 114.

Operation of power system 100 is not limited to the examples discussed above. Synchronizing and load sharing control 112 or control device 124 may perform one or more of the actions discussed above in different orders, perform one or more of the actions discussed above with different components, perform one or more of the actions discussed above in different manners, omit one or more of the actions discussed above, and/or perform actions not discussed above. For example, in some cases, a subset of generator sets 110 may be triggered to start up at the beginning of the process of initiating supply of electricity from one or more of generator sets 110. Additionally, rather than control devices 124 individually determining when each generator set 110 becomes ready to supply electricity, synchronizing and load sharing control 112 may receive information associated with the operation of each generator 111 and determine when it becomes ready to supply electricity. Similarly, synchronizing and load sharing control 112 or control device 124 may use additional and/or different criteria than mentioned above to determine when a generator 111 has become ready to supply electricity. The approach for transferring the role of coordinating control device 124 from one control device 124 to another may also differ from the examples discussed above.

The disclosed embodiments may provide certain performance advantages. All the biases based on Vgen 200, Vbus 202, and other data may be implemented in real time. The quick response may lead to more rapid synchronization, and a smoother adjustment of phase and frequency of generator set 110, reducing wear on generator set 110 and avoiding delay in bringing a generator set 110 on-line. In addition, the disclosed system may be less sensitive to voltage waveform noise, improving speed with which a generator set 110 may be brought on-line, and because the disclosed system is immediately responding to actual data about generator sets 110 and bus 114.

Furthermore, most of the components involved are inexpensive, making both retrofitting existing generator sets 110 and adding the disclosed embodiments to new generator sets 110 inexpensive. A final advantage may be that the disclosed embodiments may match the frequency, phase, and voltage of Vgen 200 and Vbus 202, allowing generator breaker 116 to be closed.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims.

What is claimed is:

1. A method of operating a power system, the power system including a plurality of generator sets and a bus, each generator set including at least a generator and an engine, the method comprising:

monitoring at least one generator set that is disconnected from the bus;
monitoring the bus;
supplying, to a control device, information associated with the operating state of each of the generator sets and information associated with the bus;
determining a relative frequency mismatch between the frequency of the bus and the frequency of the generator;
multiplying the relative frequency mismatch between the frequency of the bus and the frequency of the generator by a first weight factor to generate a frequency speed bias for the generator set;
determining a relative phase mismatch between the phase of the bus and the phase of the generator;
multiplying the relative phase mismatch between the phase of the bus and the phase of the generator by a second weight factor to generate a phase speed bias for the generator set;
adding the frequency speed bias and the phase speed bias to form a total speed bias; and
connecting the generator set to the bus when the voltage, frequency, and phase of the generator are within a permissible range of the voltage, frequency, and phase of the bus.

2. The method of claim 1, wherein the first weight factor is a value between one and zero and the second weight factor also is a value between one and zero, wherein if the first weight factor increases, the second weight factor may decrease and if the first weight factor decreases, the second weight factor may increase.

3. The method of claim 2, further including setting the first weight factor equal to one if the relative frequency mismatch between the frequency of the bus and the frequency of the generator is above a first frequency error value, and setting the first weight factor equal to zero if the relative frequency mismatch between the frequency of the bus and the frequency of the generator is below a second frequency error value.

4. The method of claim 3, wherein the first frequency error value is between five hertz and five-tenths of a hertz, and the second frequency error value is between one hertz and one-tenth of a hertz.

5. The method of claim 1, further including initiating the frequency speed bias and the phase speed bias to generate the total speed bias when the relative frequency mismatch between the frequency of the bus and the frequency of the generator is below a value with a range between ten hertz and one hertz.

6. The method of claim 1, wherein determining the relative frequency mismatch between the frequency of the bus and the frequency of the generator includes comparing the outputs of a first integrator with an input of a fixed value based on whether the generator instantaneous voltage is positive, and a second integrator with an input of a fixed value based on whether the bus instantaneous voltage is positive, to determine the relative frequency mismatch of the generator and the bus.

7. The method of claim 1, further including restricting the maximum level of the frequency speed bias and restricting the maximum level of the phase speed bias.

8. The method of claim 1, wherein determining the relative phase mismatch between the phase of the bus and the phase of the generator includes determining whether the phase of the generator lags or leads the phase of the bus and applying XOR logic to a logic signal of the generator voltage waveform and a logic signal of the bus voltage waveform.

9. The method of claim 1, further including controlling a plurality of generators with a synchronization and load sharing control including a plurality of control devices, each control device being associated with one of the plurality of generators.

10. A power system, comprising:
a bus;
a plurality of generator sets operable to supply electricity to an electric power load;
a generator set including at least a generator and an engine;
a frequency speed bias circuit, configured to input a voltage waveform from the generator, input a voltage waveform from the bus, generate a relative frequency mismatch, multiply the relative frequency mismatch by a first weight factor, and output a frequency speed bias from a first PID controller;
a phase speed bias circuit, configured to input a voltage waveform from the generator, input a voltage waveform from the bus, generate a signal proportional to a phase error between the generator and the bus, multiply the signal proportional to the phase error between the generator and the bus by a second weight factor, and output a phase speed bias from a second PID controller;
a total speed bias circuit, configured to add the frequency speed bias and the phase speed bias to form a total speed bias; and
a generator breaker configured to connect the generator to the bus when the voltage, frequency, and phase of the generator are within a permissible range of the voltage, frequency, and phase of the bus.

11. The power system of claim 10, wherein the first weight factor is a value between one and zero and the second weight factor also is a value between one and zero, wherein if the first weight factor increases, the second weight factor may decrease and if the first weight factor decreases, the second weight factor may increase.

12. The power system of claim 11, further including the first weight factor is equal to one if the relative frequency mismatch is above a first frequency error value, and the first weight factor equal to zero if the relative frequency mismatch is below a second frequency error value.

13. The power system of claim 12, wherein the first frequency error value is between five hertz and five-tenths of a hertz, and the second frequency error value is between one hertz and one-tenth of a hertz.

14. The power system of claim 10, further including the total speed bias circuit initiating the total speed bias when the relative frequency mismatch between the frequency of the bus and the frequency of the generator is below a value selected from a range between ten hertz and one hertz.

15. The power system of claim 10, wherein:
the frequency speed bias circuit includes a first integrator and a second integrator, the input to the first integrator being a fixed value based on whether the generator instantaneous voltage is positive and the input to the second integrator being a fixed value based on whether the bus instantaneous voltage is positive, whereby the difference between the first integrator and the second integrator outputs, just before reset of the first integrator and second integrator, determines the relative frequency mismatch of the generator and the bus; and
the phase speed bias circuit is configured to apply XOR logic to a logic signal of the generator voltage waveform and a logic signal of the bus voltage waveform and includes both an XOR output immediately after a leading edge occurrence of the logic signal of the bus voltage waveform, and a logic signal of the bus voltage waveform output detector, using an AND logic function block to compare the results to determine if the phase of the generator lags or leads the phase of the bus.

16. The power system of claim 10, further including a signal limiter that restricts the amount of instantaneous change the frequency speed bias can apply to the speed of an engine of the generator, a signal limiter that restricts the amount of instantaneous change the phase speed bias can apply to the speed of an engine of the generator, and a signal limiter to restrict the amount of instantaneous change the total speed bias can apply to the speed of an engine of the generator.

17. The power system of claim 10, wherein the power system includes a synchronization and load sharing control with a plurality of control devices, each control device being associated with one or more of the plurality of generators and each control device configured to control one or more generators.

18. A power system, comprising:
a bus;
a plurality of generator sets operable to supply electricity to an electric power load;
a generator set including at least a generator and an engine;
a synchronization and load sharing control, comprising:
    a frequency speed bias circuit, including a bandpass filter, a hard limiter, an integrator which resets on leading edge, a hold block, a summer, a first weight factor multiplier, and a first PID controller, the frequency speed bias circuit outputting a frequency speed bias;
    a phase speed bias circuit, including a bandpass filter, a hard limiter, an integrator which resets on leading edge, a first logic function block, a hold block, a leading edge detector, a second logic function block, a second weight factor multiplier, and a second PID controller, the phase speed bias circuit outputting a phase speed bias;
    a total speed bias circuit, including a summer and a limiter, the total speed bias circuit outputting a total speed bias; and
a generator breaker to connect the generator set to the bus when the voltage, frequency, and phase of the generator set are within a permissible range of the voltage, frequency, and phase of the bus.

19. The power system of claim 18, wherein:
the first weight factor is a value between one and zero;
the second weight factor also is a value between one and zero;
if the first weight factor increases, the second weight factor may decrease and if the first weight factor decreases, the second weight factor may increase;
the first weight factor is equal to one if the relative frequency mismatch is above a first frequency error value;
the first frequency error value is between five hertz and five-tenths of a hertz;
the first weight factor is equal to zero if the relative frequency mismatch is below a second frequency error value;
the second frequency error value is between one hertz and one-tenth of a hertz; and
the total speed bias circuit initiating the total speed bias when the relative frequency mismatch between the frequency of the bus and the frequency of the generator is below a value selected from a range between ten hertz and one hertz.

20. The power system of claim 19, wherein the synchronization and load sharing control has a plurality of frequency speed bias circuits, phase speed bias circuits, and total speed bias circuits.

* * * * *